United States Patent [19]

Aramaki et al.

[11] 4,034,068
[45] July 5, 1977

[54] PROCESS FOR PREPARATION OF AMMONIUM TETRAFLUOROALUMINATE

[75] Inventors: Minoru Aramaki; Etsuo Ushirogouchi, both of Ube, Japan

[73] Assignee: Central Glass Co., Ltd., Ube, Japan

[22] Filed: Oct. 24, 1975

[21] Appl. No.: 625,476

[30] Foreign Application Priority Data

Oct. 28, 1974 Japan .......................... 49-123467

[52] U.S. Cl. .............. 423/465; 423/396; 423/470; 423/549
[51] Int. Cl.$^2$ .............. C01F 7/50; C01C 1/16; C01C 1/18
[58] Field of Search .......... 423/465, 545, 549, 396, 423/470

[56] References Cited

UNITED STATES PATENTS

| | | | |
|---|---|---|---|
| 3,556,717 | 1/1971 | Kidde | 423/465 |
| 3,615,180 | 10/1971 | Kadotani et al. | 423/465 |
| 3,635,659 | 1/1972 | Kidde | 423/465 |
| 3,647,366 | 3/1972 | Thoonen | 423/465 X |
| 3,694,150 | 9/1972 | Kidde | 423/465 |
| 3,755,548 | 8/1973 | Weise et al. | 423/465 X |

FOREIGN PATENTS OR APPLICATIONS

| | | | |
|---|---|---|---|
| 635,552 | 4/1950 | United Kingdom | 423/465 |
| 154,328 | 11/1920 | United Kingdom | 423/545 |

*Primary Examiner*—Edward Stern
*Attorney, Agent, or Firm*—Lowe, King, Price & Markva

[57] ABSTRACT

An inorganic acid typified by $H_2SO_4$ is added to an aqueous slurry of $(NH_4)_3AlF_6$ and either $Al(OH)_3$ or $Al_2O_3$, and the resulting mixture is kept for a while under the atmospheric pressure at or somewhat above room temperature. The acid is added preferably in such an amount that the pH of the slurry after completion of the reaction is 4 to 7.

10 Claims, No Drawings

PROCESS FOR PREPARATION OF AMMONIUM TETRAFLUOROALUMINATE

This invention relates to a process for the preparation of ammonium tetrafluoroaluminate, particularly, from ammonium hexafluoroaluminate. Ammonium tetrafluoroaluminate is known as an industrially useful compound, e.g., for the preparation of aluminum fluoride.

In a conventional liquid phase process for the preparation of ammonium tetrafluoroaluminate, an aluminum salt such as aluminum sulfate, aluminum nitrate or aluminum chloride is added to and allowed to react with an aqueous solution of ammonium fluoride. A technical disadvantage of this process is difficulty in obtaining ammonium tetraluoroaluminate of a satisfactorily high purity because of formation of ammonium hexafluoroaluminate as a by-product. Another process has been disclosed in a Japanese Patent Application, public Disclosure No. 49-61088. In this process, an aqueous solution of ammonium fluoride is caused to react with either aluminum oxide or aluminum hydroxide to form ammonium tetrafluoroaluminate either by keeping the reaction system under a reaction condition created by a combination of a considerably high pressure and an elevated temperature or by blowing steam through the reaction system. Industrial application of this process appears to be not particularly advantageous by reason of needing either a severe reaction condition or a large quantity of steam.

It is therefore an object of the present invention to provide an economical process of preparing substantially pure ammonium tetrafluoroaluminate.

It is another object of the invention to provide a process of preparing substantially pure ammonium tetrafluoroaluminate, which process allows a relatively inexpensive aluminum compound, namely, aluminum hydroxide or aluminum oxide, to be used as one of the raw materials and can be performed under a mild and readily realizable reaction condition.

According to the present invention, a process of preparing ammonium tetrafluoroaluminate comprises the steps of preparing an aqueous slurry of ammonium hexafluoroaluminate and an aluminum compound selected from aluminum hydroxide and aluminum oxide, and adding an inorganic acid to the slurry to precipitate ammonium tetrafluoroaluminate.

The precipitation occurs in a short time merely by keeping the reaction system under the atmospheric pressure at or somewhat above room temperature, more preferably at a temperature between 70° and 100° C. To neutralize free ammonia in the slurry and maintain the solubility of the formed ammonium tetrafluoroaluminate at low values, the inorganic acid is added preferably in such an amount that the pH of the mother liquor after completion of the reaction is in the range between 4.0 and 7.0.

Other features and advantages of the invention will become apparent from the following detailed description of preferred embodiments thereof.

Practicable processes are known for the preparation of ammonium hexafluoroaluminate, a starting material in a process according to the invention. This compound is usually prepared by adding either aluminum hydroxide or aluminum oxide to an aqueous solution of ammonium fluoride. Alternatively, an aluminum salt typified by aluminum sulfate may be added to the same solution. For a process according to the invention, the former process is preferable since the reaction system containing therein solid phase ammonium hexaluoroaluminate can be used with no extra procedure as the aqueous slurry for producing ammonium tetrafluoroaluminate only if aluminum hydroxide or aluminum oxide is added initially in slight excess.

When aluminum hydroxide is added to an aqueous solution of ammonium fluoride and the mixture is kept at a temperature of 65° to 125° C, ammonium hexafluoroaluminate is formed according to the equation (1):

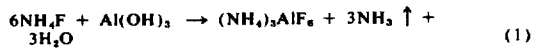

$$6NH_4F + Al(OH)_3 \rightarrow (NH_4)_3AlF_6 + 3NH_3 \uparrow + 3H_2O \quad (1)$$

This reaction system under the described condition does not form ammonium tetrafluoroaluminate even if an increased amount of aluminum hydroxide is added to the aqueous solution so that the molar ratio of aluminum hydroxide to ammonium fluoride may become 1:4. The reaction in this case proceeds according to the equation (2) and gives an aqueous slurry containing a mixture of ammonium hexafluoroaluminate and unreacted aluminum hydroxide:

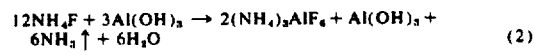

$$12NH_4F + 3Al(OH)_3 \rightarrow 2(NH_4)_3AlF_6 + Al(OH)_3 + 6NH_3 \uparrow + 6H_2O \quad (2)$$

The liberated ammonia is taken out of the reaction system either during the reaction or after completion of the reaction and recovered in the form of either ammonia gas or an aqueous ammonia solution. An analogous slurry and ammonia are produced also when aluminum oxide is used in place of aluminum hydroxide.

The concentration of the thus obtained aqueous slurry is adjusted to a value ranging from 10 to 40% by weight, more preferably 15 to 30%, before the addition of an inorganic acid. Examples of useful inorganic acids are sulfuric acid, hydrochloric acid and nitric acid. The amount of aluminum hydroxide or aluminum oxide added to the initial solution of ammonium fluoride is preferably in the range between 95 and 105% of a calculated value on the assumption that ammonium tetrafluoroaluminate is formed. Alternatively, aluminum hydroxide or aluminum oxide is added initially in a smaller amount so that the reaction of equation (1) may take place and supplemented after the formation of ammonium hexafluoroaluminate in an amount just sufficient for completing the reaction of typically the following equation (3):

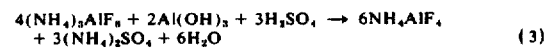

$$4(NH_4)_3AlF_6 + 2Al(OH)_3 + 3H_2SO_4 \rightarrow 6NH_4AlF_4 + 3(NH_4)_2SO_4 + 6H_2O \quad (3)$$

This reaction proceeds easily and forms ammonium tetrafluoroaluminate in quite a short time after the addition of the inorganic acid to the slurry. It will be apparent that the molar ratio of ammonium hexafluoroaluminate to the acid is different when hydrochloric acid or nitric acid is used in place of sulfuric acid because of the differences in the ratios of molecular weight to chemical equivalent between the acids, and equation (3) may therefore be rewritten as equations (4) and (5) for hydrochloric acid and nitric acid reactions respectively as follows:

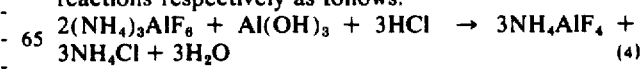

$$2(NH_4)_3AlF_6 + Al(OH)_3 + 3HCl \rightarrow 3NH_4AlF_4 + 3NH_4Cl + 3H_2O \quad (4)$$

$$2(NH_4)_3AlF_6 + Al(OH)_3 + 3HNO_3 \rightarrow 3NH_4AlF_4 + 3NH_4NO_3 + 3H_2O \quad (5)$$

When free ammonia is present in the slurry of the mixture of ammonium hexafluoroaluminate and aluminum hydroxide (or aluminum oxide), the addition of an increased quantity of the acid is needed to neutralize the ammonia. It is possible, however, to expel free ammonia from the reaction system by blowing steam through the slurry instead of adding the acid in large excess. From a different point of view, the solubility of the produced ammonia tetrafluoroaluminate increases as the pH of the slurry increases with increase in the quantity of the added acid. The increase in the solubility leads to lowering in the yield. Accordingly, the inorganic acid is added to the slurry preferably in such an amount that the pH of the slurry after completion of the reaction of equation (3) is in the range between 4.0 and 7.0. The reaction of equation (3) occurs when the reaction system is kept at room temperature at the lowest, but the reaction system is preferably heated to a temperature of 70° to 100° C.

Other than the reaction of equation (1), ammonium hexafluoroaluminate as the starting material for a process according to the invention can be prepared from an aqueous solution of ammonium fluoride and aluminum sulfate by the processes disclosed in U.S. Pat. Nos. 2,981,597 and 3,501,268.

A process according to the present invention is advantageous over conventional processes in that ammonium tetrafluoroaluminate of a remarkably high purity is obtained in quite a high yield by using only relatively inexpensive materials and that the process can be performed easily and completed in a short time. Besides, the particle size of the produced ammonium tetrafluoroaluminate can be controlled optionally in a process according to the invention. The particle size can be varied by adding the inorganic acid to the slurry in different manners. When the total amount of the acid is poured into the slurry at one time, the particle size of the crystalline ammonium tetrafluoroaluminate is in the range from about 10 to about 20 $\mu$m. The particle size increases to the ranges from about 20 to about 50 $\mu$m, and from about 50 to about 100 $\mu$m, when the acid is added intermittently and continuously in certain period of time, respectively.

The invention will be further illustrated by the following examples together with reference for comparison.

EXAMPLE 1

To 1000 ml of an aqueous solution containing 200 g of ammonium fluoride, 106 g of commercially available (produced by Bayer's process) aluminum hydroxide was added. The mixture was kept at 95° C for 4 hr with stirring to form ammonium hexafluoroaluminate. A portion of the liberated ammonia was allowed to go out of the reaction system. After the lapse of 4 hr, the mixture was in the form of an aqueous slurry containing 176 g of ammonium hexafluoroaluminate (170 g as a solid and 6 g dissolved), 35 g of aluminum hydroxide and 4 g of free ammonia.

Then, 79.2 g of 98% sulfuric acid was added to this slurry by dropping continuously, and the slurry was kept under the atmospheric pressure at 80° C for 20 min with stirring. The molar ratio of ammonium hexafluoroaluminate (176g., 0.90 mol.) to sulfuric acid (77.6g., 0.79 mol.) was about 4:3.5. Thereafter the solid component was separated from the slurry and identified as 162 g of substantially pure ammonium tetrafluoroaluminate in the crystalline form. Average particle sizes of the individual crystals were in the range from about 70 to about 90 $\mu$m. The fluorine concentration in the mother liquor was 0.18 Wt% and the pH was 5.3. The purity of the thus produced ammonium tetrafluoroaluminate was 99.1% and the yield based on F was 98.2%.

EXAMPLE 2

The aqueous slurry of ammonium hexafluoroaluminate and aluminum hydroxide was prepared according to Example 1, and 166 g of 35% hydrochloric acid was added to this slurry. The molar ratio of ammonium hexafluoroaluminate to hydrochloric acid (58g., 1.59 mol.) was about 2:3.5. The resulting mixture was kept under the atmospheric pressure at 80° C for 20 min with stirring. Then the solid component, which was crystalline ammonium tetrafluoroaluminate, was separated from the slurry by filtration. The thus obtained crystals weighed 162 g in all and individually had average particle sizes ranging from about 60 to about 70 $\mu$m. The fluorine concentration in the matter liquor was 0.19 Wt% and the pH was 5.5. The purity of the product was 99.1% and the yield based on F was 98.1%.

EXAMPLE 3

The aqueous slurry of ammonium hexafluoroaluminate and aluminum hydroxide was again the same as in Example 1, and 161 g of 62% nitric acid was added to this slurry. The molar ratio of ammonium hexafluoroaluminate to nitric acid (100g., 1.58 mol.) was about 2:3.5. The resulting mixture was kept under the atmospheric pressure at 30° C for 120 min with stirring. After that, the solid component was separated from the slurry by filtration and identified as crystalline ammonium tetrafluoroaluminate. The crystals weighed 162 g in all and individually had average particle sizes ranging from about 50 to about 80 $\mu$m. The fluorine concentration in the mother liquor was 0.18 Wt% and the pH was 5.5. The purity of the product was 99.1% and the yield based on F was 98.2%.

REFERENCE 1

The aqueous slurry of ammonium hexafluoroaluminate and aluminum hydroxide prepared in Example 1 was kept at 80° C for 20 min with stirring but without adding any inorganic acid. Substantially no reaction occurred in the slurry, and the formation of ammonium tetrafluoroaluminate was not recognized.

REFERENCE 2

The same aqueous slurry as in Example 1 was put into an autoclave without addition of any inorganic acid and kept at 180° C for 60 min with stirring. Then the reaction system was cooled to 50° C in 60 min. The solid component was separated from the slurry by filtration and identified as a mixture, weighing 157 g in its entirety, of 93.6 Wt% of ammonium tetrafluoroaluminate, 5.1 Wt% of ammonium hexafluoroaluminate and 1.3 Wt% of aluminum hydroxide. The yield of ammonium tetrafluoroaluminate based on F was 94.4%.

EXAMPLE 4

To prepare ammonium hexafluoroaluminate, 644 g of 25% aqueous solution of aluminum sulfate was added to 557 g of 40% aqueous solution of ammonium fluoride (accordingly the weight ratio of $Al_2(SO_4)_3$ to $NH_4F$ was 161 g : 223 g). A crystalline product separated out immediately. Then an aqueous ammonia solution was added to the resulting slurry, so that the pH of the slurry was maintained at 5 to 6. After completion of stirring for 30 min, the crystalline product was separated from the slurry by filtration followed by washing with water and drying. The product weighed 176 g and identified by X-ray analysis as substantially pure $(NH_4)_3AlF_6$. The yields based on F and Al were 90% and 96%, respectively.

The thus prepared $(NH_4)_3AlF_6$ (176 g) and 35 g of $Al(OH)_3$ were added to 1000 ml of an aqueous solution containing 67 g of $H_2SO_4$, and the mixture was kept at 80° C for 30 min with stirring. After that, the solid component, which was $NH_4AlF_4$, was separated from the slurry by filtration. The individual crystals of the thus produced $NH_4AlF_4$ had average particle sizes in the range from about 60 to about 80 μm. The weight of the product was 162 g, the purity was 99.1% and the yield based on F was 98.2%. The fluorine concentration in the mother liquor was 0.18 Wt% and the pH was 5.5.

What is claimed is:

1. A process for the preparation of ammonium tetrafluoroaluminate comprising the steps of:
   a. preparing an aqueous slurry of ammonium hexafluoroaluminate and an aluminum compound selected from the group consisting of aluminum hydroxide and aluminum oxide, the molar ratio of said ammonium hexafluoroaluminate to said aluminum compound being about 1:1/2;
   b. adding an inorganic acid selected from the group consisting of sulfuric acid, hydrochloric acid and nitric acid to said slurry in such an amount that the molar ratio of said ammonium hexafluoroaluminate to said inorganic acid in the resulting mixture is about 4:3 for sulfuric acid, and about 2:3 for hydrochloric acid and nitric acid, leaving an excess amount of the acid necessary to neutralize free ammonia which may be present in said slurry; the resultant reaction system being kept at a temperature between room temperature and about 100° C. at atmospheric pressure; and
   c. recovering the ammonium tetrafluoroaluminate product from the reaction system in crystalline form by filtration.

2. A process according to claim 1 wherein said aluminum compound is aluminum hydroxide.

3. A process according to claim 1 wherein said slurry is prepared by adding said aluminum compound to an aqueous solution of ammonium fluoride wherein the molar ratio of said aluminum compound to said ammonium fluoride is in the range of about 1:4 and heating the resulting mixture to a temperature of 65°–125° C.

4. A process according to claim 3 further comprising the step of removing free ammonia liberated during preparation of said slurry in the initial step, from said slurry prior to the acid-addition step.

5. A process as claimed in claim 1 wherein the amount of said inorganic acid is such that the pH of the liquid component of said resultant mixture is within the range of 4.0–7.0 after formation of ammonium tetrafluoroaluminate.

6. A process according to claim 5 wherein said reaction of said ammonium hexafluoroaluminate to said aluminum compound is conducted at a temperature between about 70° and 100° C.

7. A process as claimed in claim 6 wherein the concentration of said slurry before the addition of said inorganic acid is in the range of from 10 to 40% by weight.

8. A process as claimed in claim 1 wherein said inorganic acid is added to said slurry at step (b) in such an addition rate that the particle size of the crystalline product obtained at step (c) is regulated within the range from about 10 to about 100 μm.

9. A process as claimed in claim 8, wherein said addition rate is such that said particle size is regulated within the range from about 50 to about 90 μm.

10. A process for the preparation of ammonium tetrafluoroaluminate comprising the steps of:
   a. preparing an aqueous slurry of ammonium hexafluoroaluminate and an aluminum compound selected from the group consisting of aluminum hydroxide and aluminum oxide, the molar ratio of said ammonium hexafluoroaluminate to said aluminum compound being about 1:1/2;
   b. adding an inorganic acid selected from the group consisting of sulfuric acid, hydrochloric acid and nitric acid to said slurry in such an amount that the molar ratio of said ammonium hexafluoroaluminate to said inorganic acid in the resulting mixture is about 4:3.5 for sulfuric acid, and about 2:3.5 for hydrochloric acid and nitric acid, and that the pH of the liquid component of the resultant reaction system is within the range of 4.0 to 7.0 after formation of ammonium tetrafluoroaluminate, the resultant reaction system being kept at a temperature between room temperature and about 100° C. at atmospheric pressure; and
   c. recovering the ammonium tetrafluoroaluminate product from the reaction system in crystalline form by filtration.

* * * * *